US010063172B2

(12) United States Patent
Dharmadhikari

(10) Patent No.: US 10,063,172 B2
(45) Date of Patent: Aug. 28, 2018

(54) CONTROLLED BRAKING OF A GENERATOR

(71) Applicant: General Electric Company, Schenectady, NY (US)

(72) Inventor: Parag Rameshchandra Dharmadhikari, Neufahrn b. Freising (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/391,124

(22) Filed: Dec. 27, 2016

(65) Prior Publication Data

US 2018/0183370 A1 Jun. 28, 2018

(51) Int. Cl.
| | | |
|---|---|---|
| *H02P 9/08* | (2006.01) |
| *H02K 7/18* | (2006.01) |
| *H02P 9/00* | (2006.01) |
| *F03D 7/02* | (2006.01) |
| *H02K 17/42* | (2006.01) |
| *H02K 11/04* | (2016.01) |

(52) U.S. Cl.
CPC .............. *H02P 9/08* (2013.01); *F03D 7/0244* (2013.01); *H02K 7/183* (2013.01); *H02K 11/046* (2013.01); *H02K 17/42* (2013.01); *H02P 9/007* (2013.01)

(58) Field of Classification Search
CPC .......... F03D 7/0244; H02P 9/007; H02P 9/08; H02K 11/046; H02K 7/183; H02K 17/42
See application file for complete search history.

(56) References Cited

U.S. PATENT DOCUMENTS

| | | | | |
|---|---|---|---|---|
| 5,907,192 A * | 5/1999 | Lyons | ................... | F03D 7/0224 290/42 |
| 8,664,788 B1 * | 3/2014 | Wagoner | ............... | F03D 7/0244 290/44 |
| 2008/0079373 A1 * | 4/2008 | Melfi | ........................ | H02P 3/18 318/63 |
| 2011/0140430 A1 * | 6/2011 | Ritter | ...................... | H02J 3/386 290/44 |
| 2014/0110947 A1 * | 4/2014 | Mongeau | ................ | F03D 80/80 290/55 |

(Continued)

FOREIGN PATENT DOCUMENTS

EP 2574772 A1 4/2013

*Primary Examiner* — Sean Gugger
(74) *Attorney, Agent, or Firm* — Dority & Manning, P.A.

(57) ABSTRACT

Systems and methods to provide for the controlled braking of a generator (e.g., a doubly-fed induction generator (DFIG)) in a wind power system are provided. In one example implementation, a method for braking a wind-driven doubly fed induction generator can include: receiving, by one or more control devices, a command to brake a wind-driven doubly fed induction generator; and generating, by the one or more control devices, a pulse width modulation scheme for the rotor side converter to provide a rotor side output to a rotor of the doubly-fed induction generator. The rotor side output includes a non-zero DC component and an AC component. The method includes controlling, by the one or more control devices, the rotor side converter in accordance with the pulse width modulation scheme. The non-zero DC component of the rotor side output can reduce a speed of rotation of the wind-driven doubly fed induction generator.

16 Claims, 5 Drawing Sheets

(56) References Cited

U.S. PATENT DOCUMENTS

| | | | | |
|---|---|---|---|---|
| 2014/0210383 A1* | 7/2014 | Marcetic | .................. | H02P 3/18 |
| | | | | 318/375 |
| 2014/0361538 A1* | 12/2014 | Wagoner | .................. | H02P 3/22 |
| | | | | 290/44 |
| 2015/0077067 A1* | 3/2015 | Kanjiya | .................... | H02P 9/10 |
| | | | | 322/21 |
| 2015/0188468 A1* | 7/2015 | Xu | ......................... | H02P 9/007 |
| | | | | 290/44 |
| 2016/0118786 A1* | 4/2016 | Zhu | ...................... | F03D 7/0244 |
| | | | | 290/44 |
| 2016/0333856 A1* | 11/2016 | Zabalza | .................. | H02H 7/06 |
| 2017/0214335 A1* | 7/2017 | Basic | .................... | H02M 7/48 |
| 2017/0359006 A1* | 12/2017 | Marcetic | ................ | H02P 21/18 |

* cited by examiner

CONTROLLED BRAKING OF A GENERATOR

FIELD

The present disclosure relates generally to renewable energy sources, and more particularly to a systems and methods for controlled braking of a wind-driven generator.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbine systems include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades. The rotor can be required to be brought to a reduced speed or a controlled stop in various situations. The braking of the rotor can be challenging during certain circumstances.

BRIEF DESCRIPTION

Aspects and advantages of the invention will be set forth in part in the following description, or may be obvious from the description, or may be learned through practice of the invention.

One example aspect of the present disclosure is directed to a method for braking a wind-driven doubly fed induction generator. The wind-driven doubly fed induction generator can be coupled to a two-stage power converter having a line side converter and a rotor side converter. The rotor side converter can be coupled to the line side converter by a DC link. The method can include: receiving, by one or more control devices, a command to brake a wind-driven doubly fed induction generator; and generating, by the one or more control devices, a pulse width modulation scheme for the rotor side converter to provide a rotor side output to a rotor of the doubly-fed induction generator. The rotor side output can have a non-zero DC component and an AC component. The method can include controlling, by the one or more control devices, the rotor side converter in accordance with the pulse width modulation scheme. The non-zero DC component of the rotor side output can reduce a speed of rotation of the wind-driven doubly fed induction generator.

Another example aspect of the present disclosure is directed to a control system for controlling a power converter in a doubly-fed induction generator system. The power converter can be configured to provide a rotor side output to a rotor of the doubly-fed induction generator. The control system can be configured to perform operations. The operations can include: receiving a command to brake the doubly fed induction generator; and generating a pulse width modulation scheme for the rotor side converter to provide a rotor side output to a rotor o the doubly fed induction generator. The pulse width modulation scheme is generated at least in part such that the rotor side output comprises a non-zero DC component having a magnitude sufficient for braking of the doubly-fed induction generator.

Yet another example aspect of the present disclosure is directed to a power system. The power system can include a generator having a rotor and a stator and a power converter. The power converter can include a line side converter and a rotor side converter. The rotor side converter can be coupled to the line side converter by a DC link. The rotor side converter can be electrically coupled to the rotor of the generator. The system can include a control system configured to receive a command to brake the generator and generate a pulse width modulation scheme for the rotor side converter to provide a rotor side output to the rotor of the generator. The rotor side output has a non-zero DC component and an AC component. The non-zero DC component has a magnitude sufficient to reduce a rotational speed of the generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
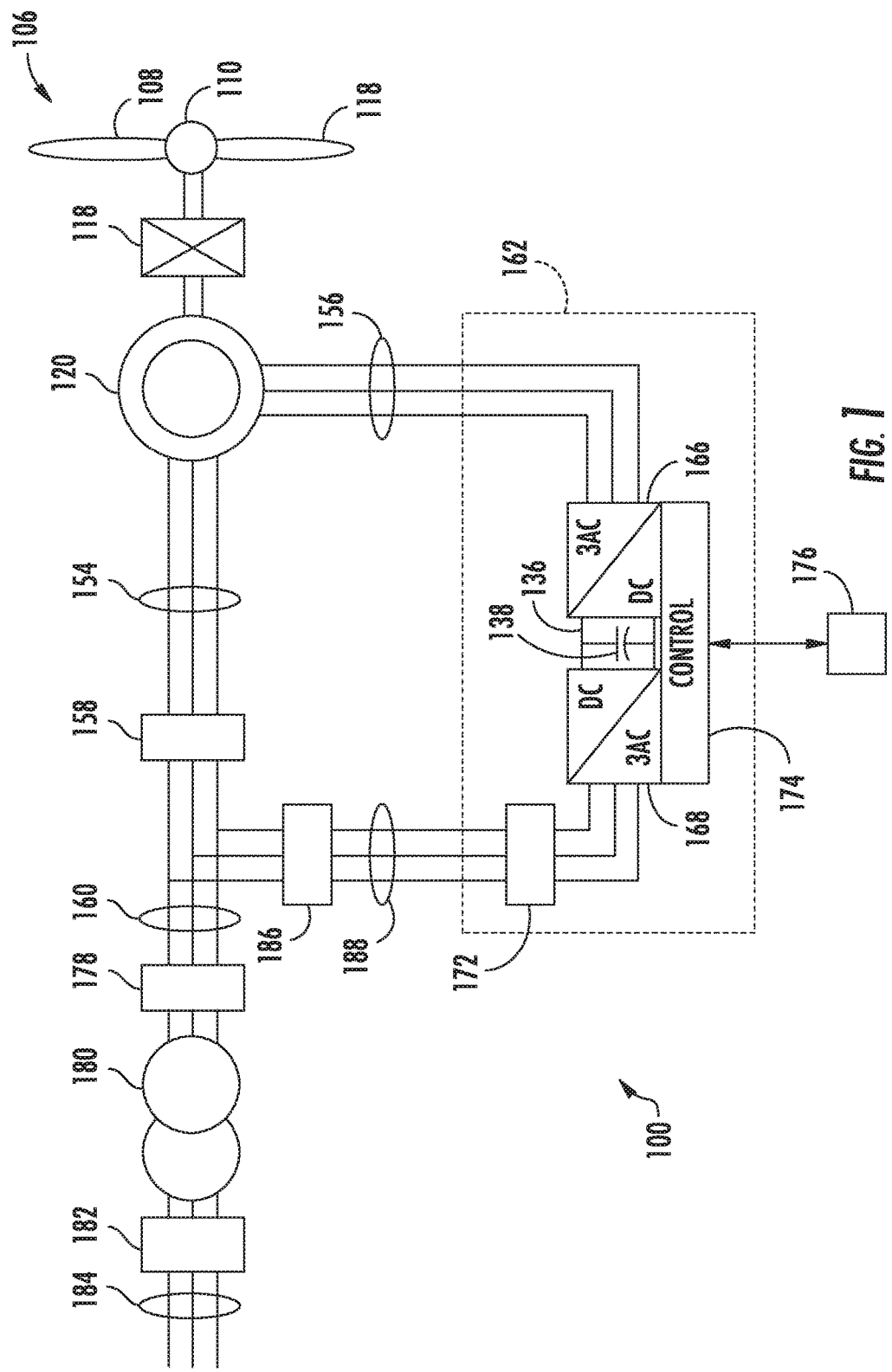
FIG. 1 depicts an example doubly fed induction generator (DFIG) wind turbine system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods to provide for the controlled braking of a generator (e.g., a doubly-fed induction generator (DFIG)) in a wind power system. According to example aspects of the present disclosure, a rotor of the DFIG can be coupled to a power converter. The power converter can be a two-stage power converter having a rotor side converter and a line side converter coupled together by a DC link (also referred to as a DC bus). The line side converter can be configured to convert AC power from a power grid to DC power for the DC link. The rotor side converter can be configured to convert DC power on the DC link to AC power for the rotor of the wind driven DFIG.

The line side converter and the rotor side converter can each include a plurality of bridge circuits. The bridge circuits can include switching elements (e.g., IGBTs, power MOSFETs, etc.) that can be switched using a pulse width modulation scheme to provide a desired output. For instance, the switching elements of the rotor side converter can be switched using a pulse width modulation scheme to convert a DC power on the DC link to a suitable AC power for the rotor of the DFIG.

According to particular embodiments of the present disclosure, the pulse width modulation scheme of the switching elements of the rotor side converter can be controlled such that the rotor side converter provides a non-zero DC component to the rotor side output provided to the rotor of the DFIG. The non-zero DC component and the AC power provided to the rotor of the DFIG will affect the magnetic field provided by the rotor of the DFIG to cause braking of the DFIG.

The subject matter of the present disclosure can provide a number of technical effects and benefits. For example, controlling modulation of the rotor side converter according to example aspects of the present disclosure can provide a highly repeatable controlled of the braking of a DFIG with little to no extra hardware required in the power system This can increase the simplicity of the power system and lower cost.

Referring to FIG. 1, an example DFIG wind turbine system 100 will now be discussed in detail. The present disclosure will be discussed with reference to the example DFIG wind turbine system 100 of FIG. 1 for purposes of illustration and discussion. Those of ordinary skill in the art, using the disclosures provided herein, should understand that aspects of the present disclosure are also applicable in other power systems.

In the example system 100, a rotational component 106 includes a plurality of rotor blades 108 coupled to a rotating hub 110. The rotational component 106 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. The DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for operating using pulse width modulation (PWM) arrangement of insulated gate bipolar transistors (IGBTs) switching devices or other switching devices as will be discussed in more detail with respect to FIG. 2. The rotor side converter 166 and the line side converter 168 can be coupled via a DC link 136 across which is the DC link capacitor 138.

Figure 5:
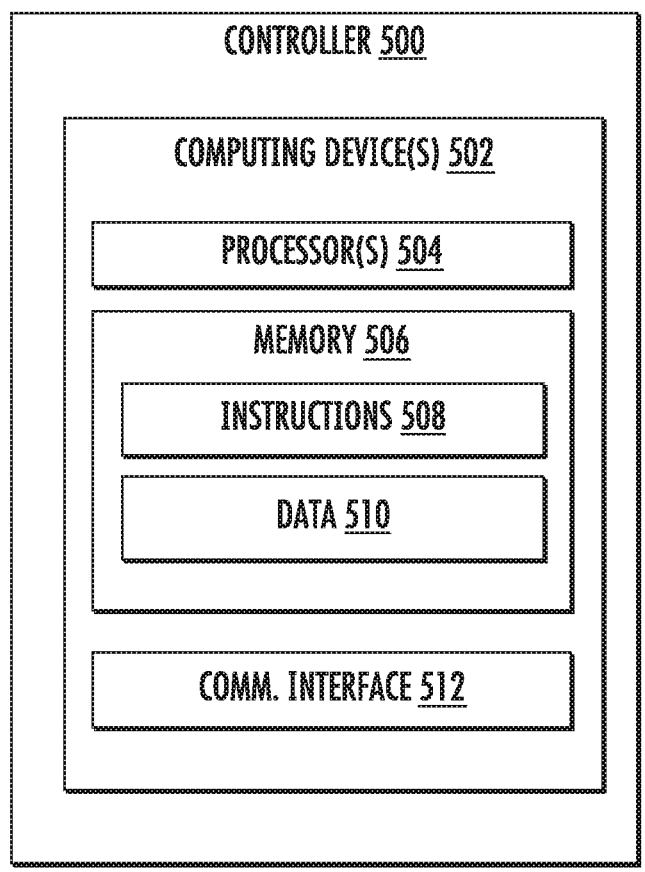
FIG. 5 depicts a controller for implementing one or more aspects according to example embodiments of the present disclosure.

The power converter 162 can be coupled to a controller 174 to control the operation of the rotor side converter 166 and the line side converter 168. It should be noted that the controller 174, in typical embodiments, is configured as an interface between the power converter 162 and a control system 176. Aspects of an example controller are illustrated in FIG. 5.

In some configurations, various line contactors and circuit breakers including, for example, grid breaker 182 can be included for isolating the various components as necessary for normal operation of DFIG 120 during connection to and disconnection from the electrical grid 184. A system circuit breaker 178 can couple the system bus 160 to transformer 180, which is coupled to the electrical grid 184 via grid breaker 182.

In operation, power generated at DFIG 120 by rotating the rotational component 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As will be discussed in more detail below, switching devices (e.g. IGBTs) used in parallel bridge circuits of the rotor side power converter 166 can be modulated to convert the AC power provided from the rotor bus 156 into DC power suitable for the DC link 136.

The line side converter 168 converts the DC power on the DC link 136 into AC power suitable for the electrical grid 184. In particular, switching devices (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

As will be discussed in detail below, the rotor side converter 166 can provide a rotor side output to the rotor of the DFIG 120 to cause braking of the DFIG 120 (e.g., reducing rotational speed of the DFIG 120). The rotor side output can include an AC component and a DC component. The DC component can have a magnitude sufficient to provide a desired breaking torque for the DFIG 120. The AC component can have a magnitude to maintain a threshold voltage on the DC link 136.

Various circuit breakers and switches, such as grid breaker 182, system breaker 178, stator sync switch 158, converter breaker 186, and line contactor 172 can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 176 via the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

In some embodiments, signals from a voltage sensor indicative of a voltage on the DC link 136 can be provided to the control system 176 for use in determining a magnitude of a DC component of a rotor side output for braking the DFIG 120. In some embodiments, signals from a sensor indicative of the torque of the DFIG 120 can be provided to control system 176 for use in determining a magnitude of an AC component of a rotor side output for braking the DFIG 120.

Figure 2:
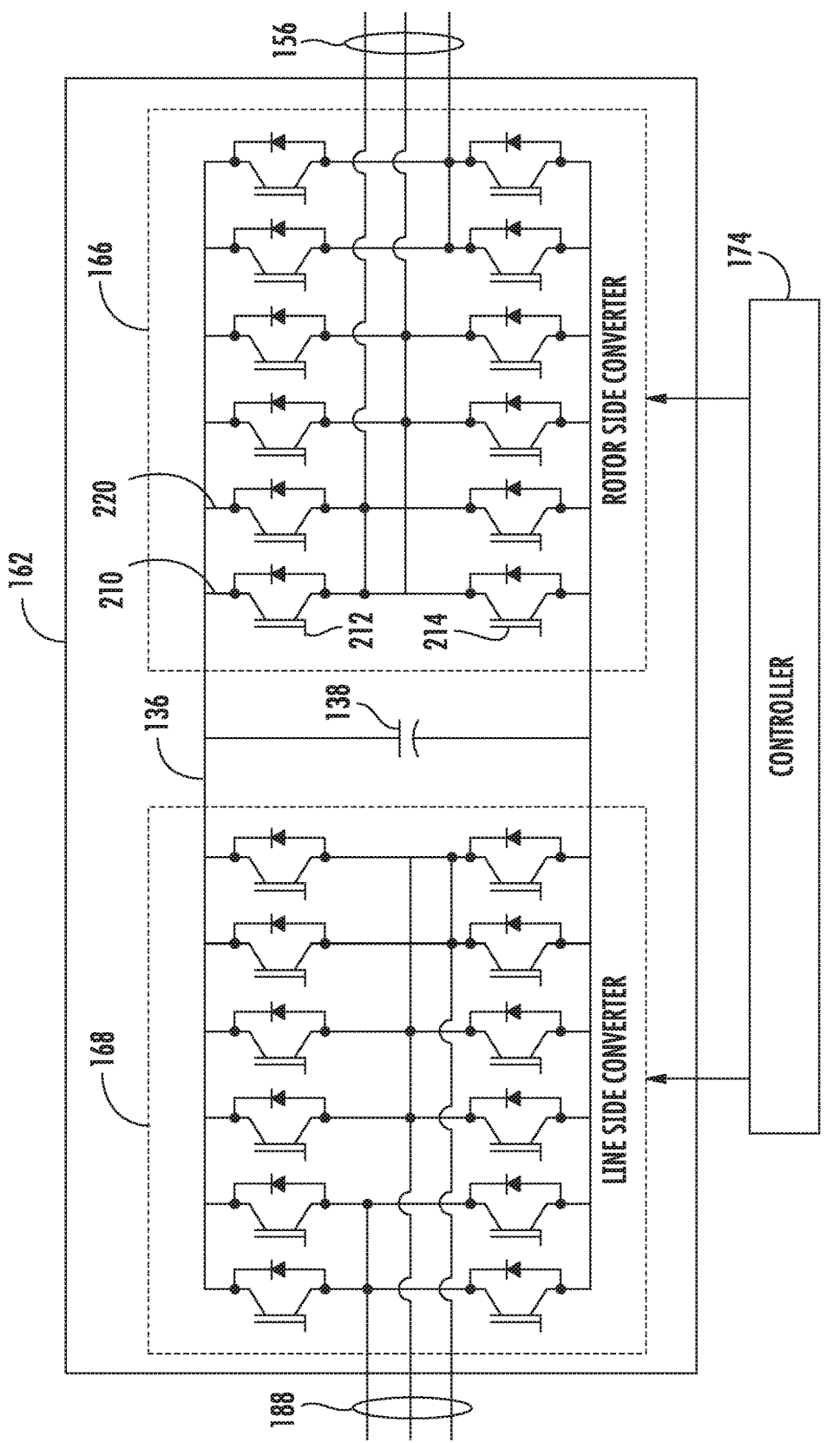
FIG. 2 depicts aspects of an example power converter used in a DFIG wind turbine system according to an example aspect of the present disclosure.

FIG. 2 depicts aspects of an example power converter 162 in accordance with aspects of the present disclosure. As illustrated, both the rotor side converter 166 and the line side converter 168 include a plurality of bridge circuits coupled in parallel. More particularly, each phase of the rotor bus 156 input to the rotor side converter 166 is coupled to two bridge circuits (e.g. bridge circuits 210 and 220) coupled in parallel. Each phase of the line side bus 188 output from the line side converter 168 is coupled to two bridge circuits coupled in parallel. Using parallel bridge circuits can increase the output capability of the power converter 162.

In FIG. 2, both the line side converter 168 and the rotor side converter 166 are illustrated as having parallel bridge circuits for example purposes. Those of ordinary skill in the art, using the disclosures provided herein, should appreciate that the line side converter 168, the rotor side converter 166, both the line side converter 168 and the rotor side converter 166 can include single bridge circuits for each phase without deviating from the scope of the present disclosure.

Each bridge circuit includes a plurality of IGBTs coupled in series with one another. For instance, each bridge circuit includes an upper IGBT (e.g. IGBT 212) and a lower IGBT (e.g. IGBT 214). A diode is coupled in parallel with each of the IGBTs. The line side converter 168 and the rotor side converter 166 are controlled, for instance, by providing gate timing commands according to a PWM scheme, using a suitable driver circuit, to the gates of the IGBTs. For example, the controller 174 can provide suitable gate timing commands to the gates of the IGBTs of the bridge circuits. The gate timing commands can control the pulse width modulation of the IGBTs to provide a desired output. In some embodiments, the gate timing commands can be provided according to a PWM scheme generated to provide braking for the DFIG 120 according to example embodiments of the present disclosure. It will be appreciated by those of ordinary skill in the art that other suitable switching devices can be used in place of IGBTs.

Figure 3:
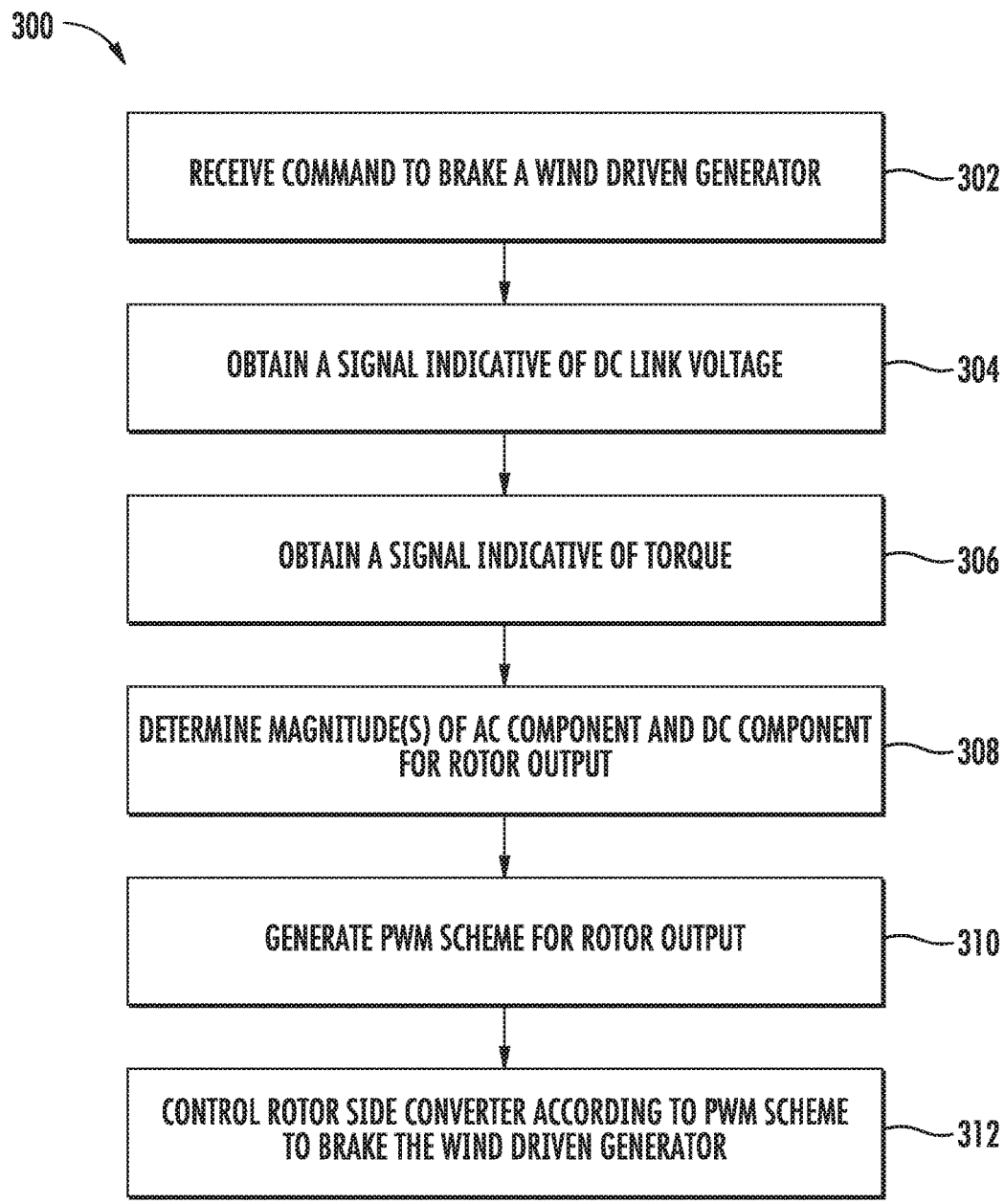
FIG. 3 depicts a flow diagram of an example method according to example embodiments of the present disclosure.

FIG. 3 depicts a flow diagram of an example method 300 according to example embodiments of the present disclosure. FIG. 3 can be implemented using one or more control devices, such as any of the control devices described in this application (e.g., control 174, control system 176, control system 500, etc.). In addition, FIG. 3 depicts steps performed in a particular order for purposes of illustration and discussion. Those of ordinary skill in the art, using the disclosures provided herein, will understand that various steps of any of the methods disclosed herein can be adapted, modified, omitted, performed concurrently, rearranged, and/or expanded in various ways without deviating from the scope of the present disclosure.

At (302), the method 300 can include receiving a command to brake a wind driven generator. For instance, the control system 176 can receive a command to brake the DFIG 120 of FIG. 1. The command can include a desired braking torque and/or a desired rotational speed for the DFIG. In some implementations, the command can specify that the DFIG comes to a controlled a stop.

In response to the command at (304), the method 300 can include obtaining a signal indicative of a DC link voltage. For instance, the control system 176 can receive a signal from one or more voltage sensors configured to measure a voltage of the DC link 136. The signal indicative of the DC link voltage can be used at least in part to determine an AC component for a rotor side output used to brake a wind driven generator according to example embodiments of the present disclosure.

At (306), the method 300 can include obtaining a signal indicative of a torque of the generator. For instance, the control system 176 can receive a signal from one or more sensors configured to measure a torque of the DFIG 120. The signal indicative of the torque can be used at least in part to determine a DC component for a rotor side output used to brake a wind driven generator according to example embodiments of the present disclosure. For instance, a magnitude of the DC component can be determined to provide a desired braking torque.

At (308), the method 300 can include determining an AC component and a non-zero DC component for a rotor side output of a rotor side converter providing power to the generator. For instance, the control system 176 can determine a magnitude of an AC component and a magnitude of a non-zero DC component of the rotor side output provided by the rotor side converter 166 to the DFIG.

In some embodiments, the magnitude of the AC component is determined based on the DC link voltage. For instance, the magnitude of the AC component can be minimized while still maintaining a desired voltage on the DC link. The signal indicative of the voltage of the DC link can be used to provide feedback during braking of the generator. For instance, if the voltage of the DC link drops below a threshold level during braking, the magnitude of the AC component can be increased until the DC link voltage reaches the threshold voltage.

The non-zero DC component can be determined to provide a desired braking torque for the generator. For instance, after minimizing the magnitude of the AC component to a magnitude sufficient to maintain a threshold DC link voltage, the magnitude of the non-zero DC component can be determined to provide a desired braking torque for the generator. In some embodiments, the signal indicative of the torque of the generator can be used to provide feedback during braking of the generator. For instance, if the torque is not within a desired range during braking, the magnitude of the non-zero DC component can be adjusted to achieve the desired torque. Providing a non-zero DC component as part of the rotor side output to the generator can lead to braking of the generator.

Once the AC component and the DC component are determined, the method 300 can include generating a PWM scheme for the rotor output based on the AC component and the DC component (310). In some embodiments, the PWM scheme can be generated by comparing a reference signal to a carrier signal. The reference signal can be based on the determined AC component and the determined non-zero DC component. For instance, the reference signal can simulate the rotor side output having the determined AC component and the determined non-zero DC component. When the reference signal is greater than the carrier signal, the PWM scheme can specify a high state (e.g., can close a switching device in a bridge circuit of the rotor side converter). When the reference signal is less than the carrier signal, the PWM scheme can specify a low states (e.g., can open a switching device in a bridge circuit of the rotor side converter).

Figure 4:
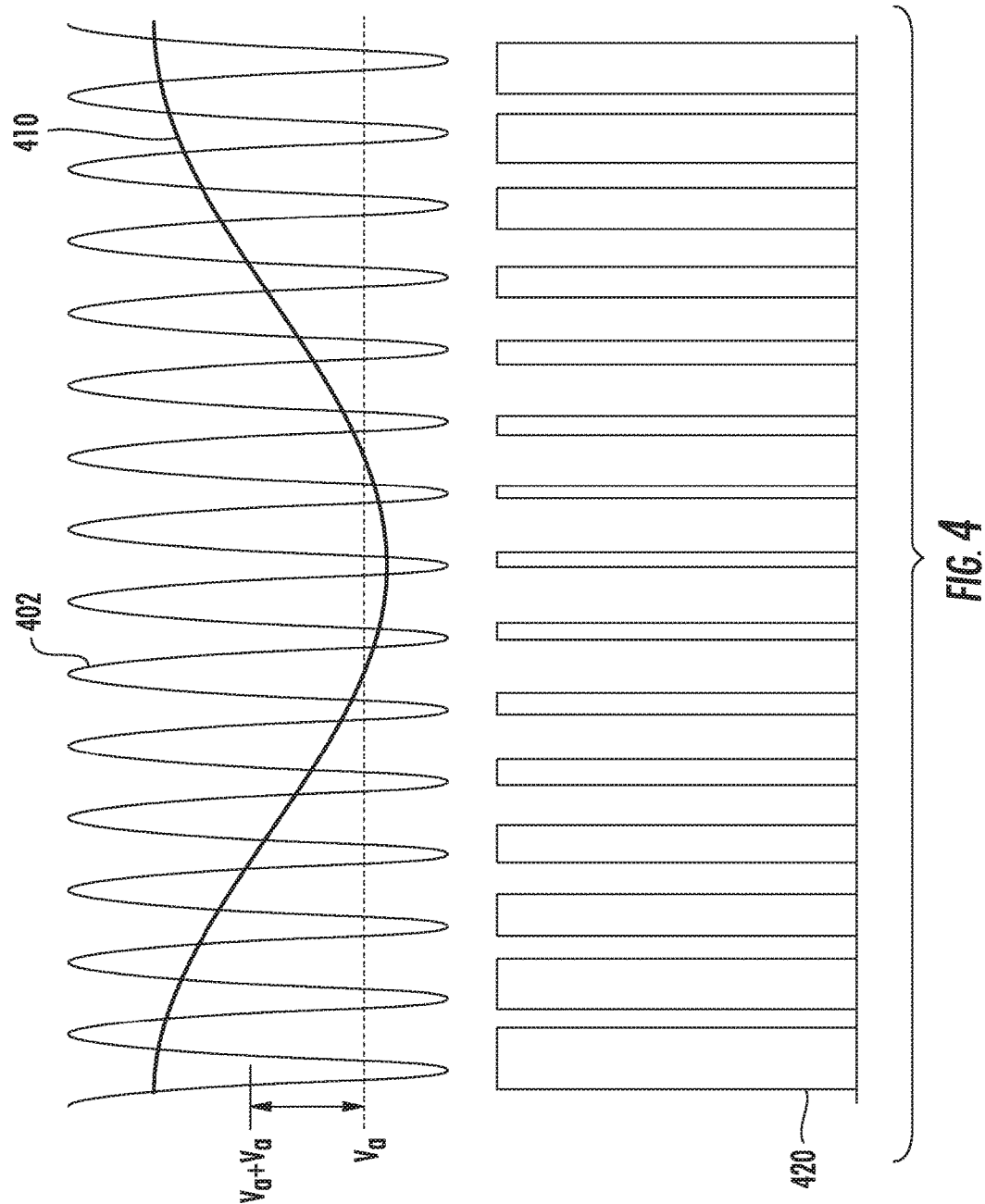
FIG. 4 depicts a flow diagram of an example method according to example embodiments of the present disclosure.

FIG. 4 depicts the example generation of a PWM scheme to provide a rotor side output having the determined AC component and the determined non-zero DC component according to example aspects of the present disclosure. More particularly, curve 402 represents a carrier signal. Curve 410 represents the reference signal. The reference signal can simulate the desired rotor side output having the determined AC component and the determined DC component. Curve 420 represents the PWM scheme. As shown, the PWM scheme 420 specifies a high state when the reference signal 410 is greater than the carrier signal 402. The PWM scheme 420 represents a low state when the reference signal 410 is less than the carrier signal 402.

At (312) of FIG. 3, the method includes controlling the rotor side converter based on the PWM scheme. For instance, one or more switching elements (e.g., IGBTs) in at least one bridge circuit of the rotor side converter can be switched according to the PWM scheme to provide the desired rotor side output for braking the generator.

FIG. 5 depicts a block diagram of an example controller 500 that can be used to implement methods and systems according to example embodiments of the present disclosure. The controller 500 can be, for example, the controller 174 or a part of control system 176. As shown, the controller 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as operations as described with reference to FIG. 3. The memory device(s) 506 can further store data 510 that can be accessed by the processors 504. For example, the data 510 can include carrier signals, PWM schemes, DC link threshold(s), torque threshold(s), historical data etc., as described herein.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for braking a wind-driven doubly fed induction generator, the wind-driven doubly fed induction generator coupled to a two-stage power converter having a line side converter and a rotor side converter, the rotor side converter coupled to the line side converter by a DC link, the method comprising:
   receiving, by one or more control devices, a command to brake the wind-driven doubly fed induction generator;
   generating, by the one or more control devices, a pulse width modulation scheme for the rotor side converter to provide a rotor side output to a rotor of the doubly-fed induction generator, the rotor side output having a non-zero DC component and an AC component;
   controlling, by the one or more control devices, the rotor side converter in accordance with pulse width modulation scheme;
   wherein the non-zero DC component of the rotor side output reduces a speed of rotation of the wind-driven doubly fed induction generator, and
   wherein the pulse width pulse width modulation scheme is generated by comparing a reference signal to a carrier signal, the pulse width modulation scheme specifying a high state when the reference signal is greater than the carrier signal and further specifying a low state when the reference signal is less than the carrier signal.

2. The method of claim 1, wherein the reference signal is determined at least in part to provide the non-zero DC component.

3. The method of claim 1, wherein the method comprises:
   obtaining a signal indicative of a voltage associated with the DC link; and
   generating the pulse width modulation scheme based at least in part on the voltage associated with the DC link.

4. The method of claim 3, wherein the pulse width modulation scheme is generated such that a magnitude of the AC component is sufficient to maintain a threshold voltage on the DC link.

5. The method of claim 4, wherein the method comprises:
obtaining a signal indicative of a torque associated with the doubly fed induction generator; and
generating the pulse width modulation scheme based at least in part on the torque.

6. The method of claim 5, wherein the pulse width modulation scheme is generated such that a magnitude of the non-zero DC component is sufficient to brake the generator with a threshold torque.

7. The method of claim 1, wherein the pulse width modulation scheme controls the switching of one or more switching elements in one or more bridge circuits of the rotor side converter.

8. A control system for controlling a power converter in a doubly-fed induction generator system, the power converter configured to provide a rotor side output to a rotor of the doubly-fed induction generator, the control system configured to perform operations, the operations comprising:
receiving a command to brake the doubly fed induction generator;
generating a pulse width modulation scheme for the rotor side converter to provide a rotor side output to the rotor of the generator;
wherein the pulse width modulation scheme is generated at least in part such that the rotor side output comprises a non-zero DC component having a magnitude sufficient for braking of the generator, and
wherein the pulse width modulation scheme is generated based at least in part on a carrier signal and a reference signal, the reference signal determined at least in part to provide the non-zero DC component.

9. The control system of claim 8, wherein the power converter comprises a two-stage power converter having a line side converter and a rotor side converter coupled by a DC link.

10. The control system of claim 9, wherein the operations comprise:
obtaining a signal indicative of a voltage associated the DC link
obtaining a signal indicative of a torque of the doubly-fed induction generator;
generating the pulse width modulation scheme based at least in part on the voltage associated with the DC link and the torque of the doubly-fed induction generator.

11. The control system of claim 10, wherein the AC component has a magnitude sufficient to maintain a threshold voltage on the DC link.

12. The control system of claim 11, wherein the pulse width modulation scheme is generated to provide a DC component sufficient to brake the generator with a threshold torque.

13. The control system of claim 9, wherein the pulse width modulation scheme controls the switching of one or more switching elements in one or more bridge circuits of the rotor side converter.

14. A power system, the system comprising:
a generator having a rotor and a stator;
a power converter comprising a line side converter and a rotor side converter, the rotor side converter coupled to the line side converter by a DC link, the rotor side converter electrically coupled to the rotor of the generator;
a control system configured to:
receive a command to brake the generator; and
in response to the command, generate a rotor side output from the rotor side converter for the rotor of the generator;
wherein the rotor side output comprises a non-zero DC component and an AC component, the non-zero DC component having a magnitude sufficient to reduce a rotational speed of the generator, and
wherein the rotor side output is generated using a pulse width modulation scheme that is determined based at least in part on a carrier signal and a reference signal, the reference signal having characteristics to provide the non-zero DC component.

15. The power system of claim 14, wherein the non-zero DC component is determined based at least in part on a torque of the generator.

16. The power system of claim 14, wherein the AC component is determined based at least in a part on a voltage of the DC link.

* * * * *